United States Patent
Clayton et al.

(10) Patent No.: US 7,430,956 B2
(45) Date of Patent: Oct. 7, 2008

(54) SINGLE-PIECE AIR CYLINDER FOR A FLUID COUPLING DEVICE

(75) Inventors: Gary Clayton, Concord, MI (US); Samuel Settineri, Marshall, MI (US); Christopher Reniger, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 202 days.

(21) Appl. No.: 11/164,123

(22) Filed: Nov. 10, 2005

(65) Prior Publication Data

US 2006/0081124 A1 Apr. 20, 2006

Related U.S. Application Data

(63) Continuation-in-part of application No. 10/904,005, filed on Oct. 19, 2004, now Pat. No. 7,137,333.

(51) Int. Cl.
*F16J 10/00* (2006.01)
(52) U.S. Cl. .................... 92/169.1; 92/165 PR
(58) Field of Classification Search ............ 92/169.1, 92/169.2, 169.3, 169.4, 165 PR
See application file for complete search history.

(56) References Cited

U.S. PATENT DOCUMENTS

| | | | |
|---|---|---|---|
| 3,985,214 A * | 10/1976 | Hall et al. | 92/165 PR |
| 4,051,936 A | 10/1977 | Crisenbery et al. | |
| 4,068,748 A | 1/1978 | Charchian et al. | |
| 4,217,976 A | 8/1980 | DeJong | |
| 4,235,322 A | 11/1980 | Sutaruk | |
| 4,269,295 A | 5/1981 | Kish | |
| 4,278,159 A | 7/1981 | Roth et al. | |
| 4,421,216 A | 12/1983 | Ellis | |
| 4,638,900 A * | 1/1987 | Deem et al. | 192/85 CA |
| 4,735,300 A | 4/1988 | Brown | |
| 5,305,865 A | 4/1994 | Larson et al. | |
| 5,960,918 A | 10/1999 | Moser et al. | |
| 6,390,567 B1 * | 5/2002 | Hurlbutt | 92/128 |
| 7,055,668 B2 * | 6/2006 | Settineri | 192/91 A |

* cited by examiner

Primary Examiner—Michael Leslie
(74) Attorney, Agent, or Firm—John A. Artz

(57) ABSTRACT

A single-piece air cylinder ("air cylinder") for a pneumatic fan drive system. The air cylinder is comprised of a single-piece stamping having a stepped tab portion for attaching to a piston rod of the pneumatic fan drive system. The air cylinder has a cylinder portion and a washer portion extending concentrically inward from the cylinder portion. The washer portion defines an aperture and has the stepped tab portion extending into the aperture. This air cylinder has a sufficiently robust construction for resisting fatigue over a significant number of operation cycles. Additionally, the air cylinder has a substantially robust construction for resisting damage associated with dropping or otherwise mishandling the air cylinder.

18 Claims, 2 Drawing Sheets

SINGLE-PIECE AIR CYLINDER FOR A FLUID COUPLING DEVICE

CROSS-REFERENCE TO RELATED APPLICATION

This application is a continuation-in-part of U.S. Ser. No. 10/904,005, filed on Oct. 19, 2004, entitled "SINGLE PIECE ELECTRO-POLISHED AIR CYLINDER FOR A FLUID COUPLING DEVICE," the disclosure of which is incorporated by reference herein.

TECHNICAL FIELD

The invention relates generally to fluid coupling devices and more specifically to a single-piece air cylinder for increasing the life of a pneumatic fan drive system, decreasing the manufacturing cycle time, and minimizing the costs associated therewith.

BACKGROUND ART

Existing pneumatic fan drive systems typically include a two-piece air cylinder, a piston rod, and a piston. Typically, the piston is slidable within the air cylinder with the piston rod attached to the air cylinder. Also, the air cylinder typically has a thin-walled stainless steel construction. As is known in the art, the stainless steel construction typically is resistant to corrosion. However, drawing stainless steel to a sufficient depth can produce cracks, scars, scratches, or various other imperfections in the stainless steel. These imperfections can cause substantial wear on components, e.g. seal rings, which slide across the surface of the air cylinder. Also, the surface finish and the thin-walled construction of the air cylinders can be easily damaged if dropped or otherwise mishandled during shipping.

One known air cylinder is mounted to a piston rod that has an end portion configured for attachment to the air cylinder. In particular, the end portion of the piston rod is comprised of an annular ledge and a threaded shaft with an axial slot, which is offset from the ledge by a predetermined distance for attaching the air cylinder to the piston rod. The air cylinder typically is comprised of a cylinder member and a separate washer member spot-welded to one end of the cylinder member. Furthermore, the washer member has a center hole with the threaded shaft of the piston rod extending therethrough. The washer member is sandwiched between the annular ledge of the piston rod and a nut fastener applied to the threaded shaft.

Moreover, the washer member typically includes a tab portion for providing additional support along the axial direction and preventing the air cylinder from spinning on the piston rod. This tab portion typically extends from the washer member into an axial slot formed in the threaded shaft of the piston rod. The tab portion of the washer member typically does not overlap the cylinder member and therefore typically is thinner than the overlapped portions of the washer member and cylinder member. For this reason, the axial slot in the threaded shaft is offset from the annular ledge by a distance generally equal to the recess or decrease in thickness for the tab portion. In that way, the ledge and the threaded shaft can respectively support the washer member and the tab portion.

It is thus highly desirable to provide a single-piece air cylinder for use in conjunction with existing piston rods for a pneumatic fan drive system and increasing the life of seal rings for those systems.

SUMMARY OF THE INVENTION

The above and other objects of the invention are met by the present invention, which is an improvement over known air cylinders for pneumatic fan drive systems. The present invention is an air cylinder comprised of a single-piece stamping having a stepped tab portion for attachment to a piston rod of the pneumatic fan drive system. This single-piece stamping has a sufficiently robust construction for resisting fatigue over a significant number of operation cycles. Additionally, the single-piece stamping has a substantially robust construction for resisting damage associated with dropping or otherwise mishandling the air cylinder.

Other features, benefits and advantages of the present invention will become apparent from the following description of the invention, when viewed in accordance with the attached drawings and appended claims.

BEST MODE(S) FOR CARRYING OUT THE INVENTION

Figure 3:
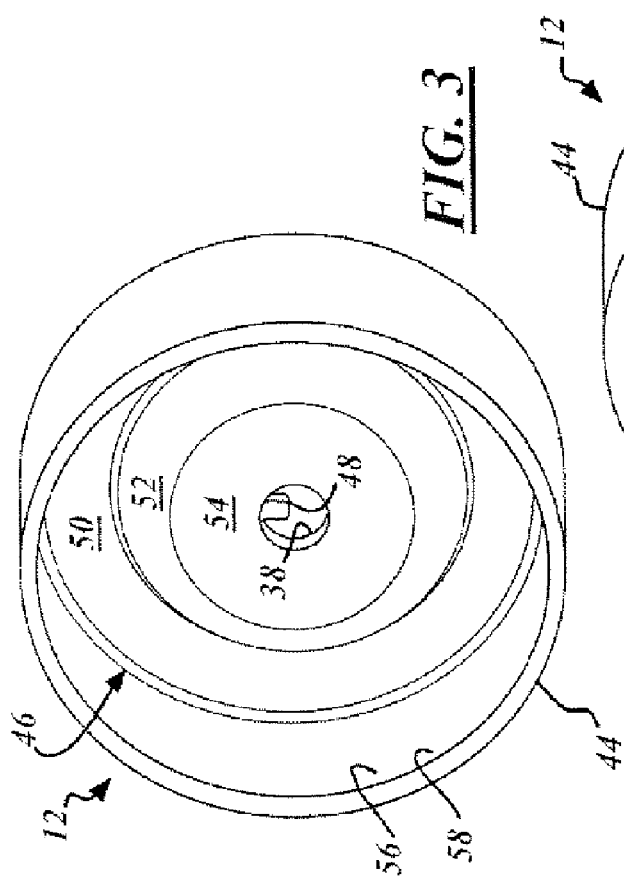
FIG. 3 illustrates a perspective interior view of the single-piece air cylinder shown in FIG. 1.
Figure 4:
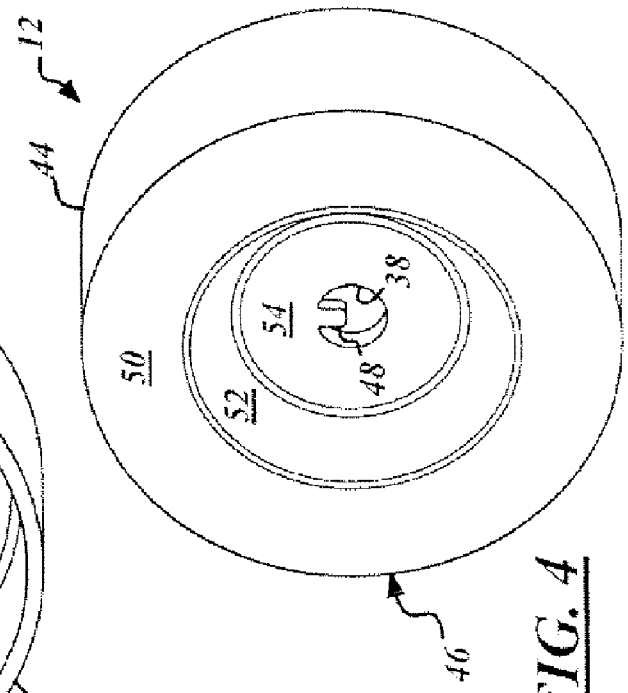
FIG. 4 illustrates a perspective exterior view of the single-piece air cylinder shown in FIG. 1.
Figure 1:
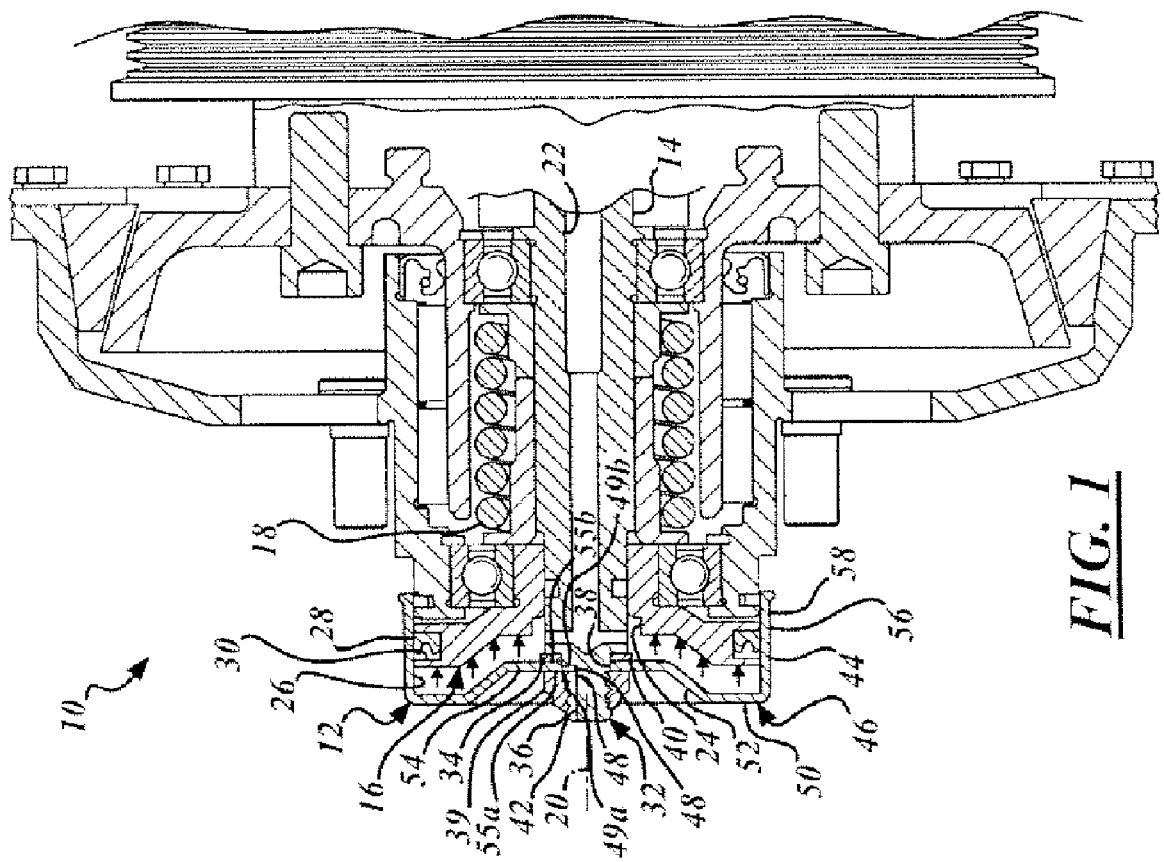
FIG. 1 illustrates a partial cross-sectional view of a pneumatic fan drive system having a single-piece air cylinder, according to one advantageous embodiment of the claimed invention.

Referring to FIG. 1, there is illustrated a partial cross-sectional view of a pneumatic fan drive system 10 having a single-piece air cylinder 12 ("air cylinder"), according to one advantageous embodiment of the claimed invention.

Figure 2:
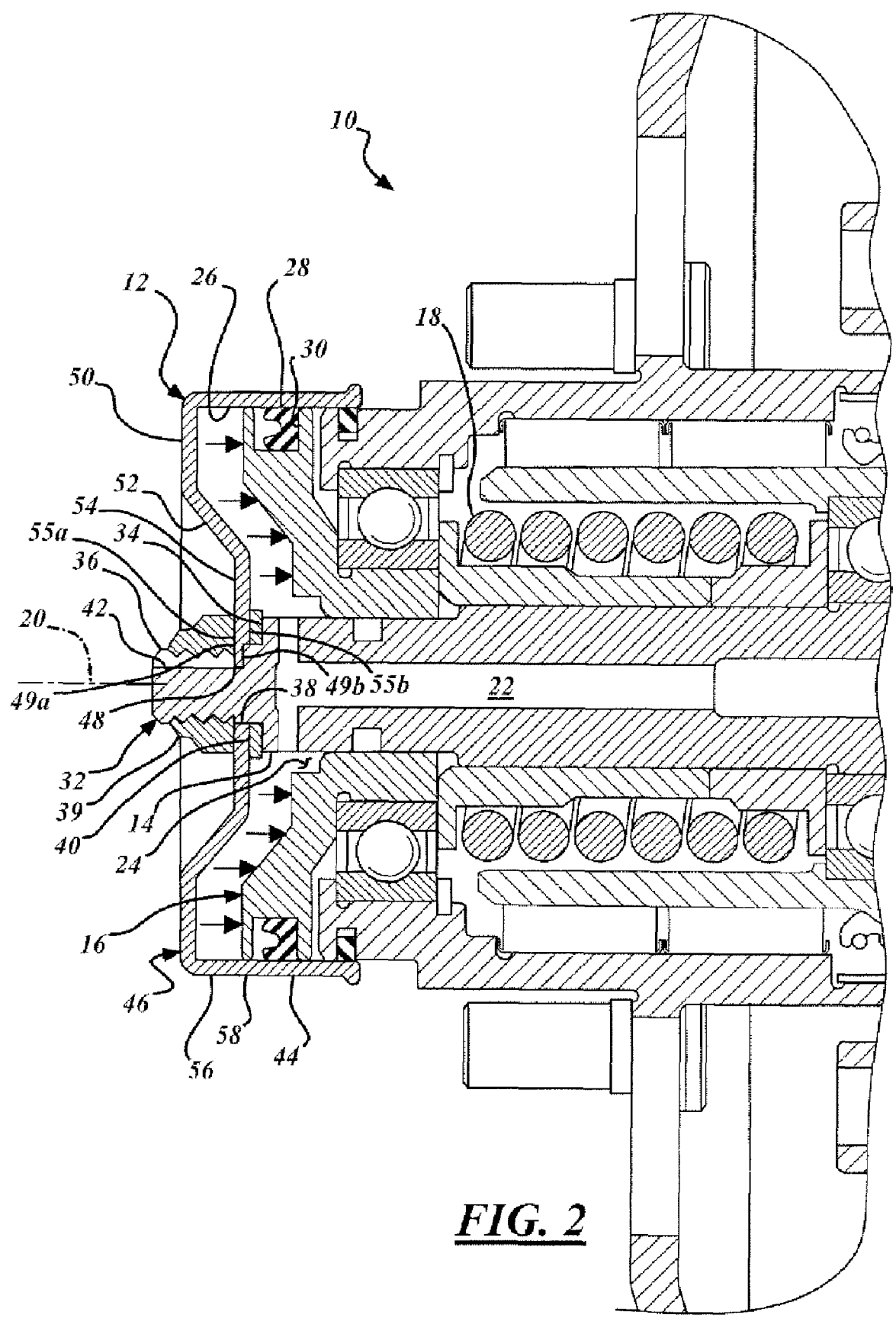
FIG. 2 illustrates an enlarged view of the pneumatic fan drive system shown in FIG. 1.

In this embodiment, the pneumatic fan drive system 10 includes the air cylinder 12, a piston rod 14, a piston 16, and a spring 18. As detailed below, the air cylinder 12 is attached to the piston rod 14. The air cylinder 12 also has the piston 16 slidable therein along a longitudinal centerline axis 20 of the piston rod 14. In particular, as best shown in FIG. 2, the piston rod 14 has a channel 22 for supplying pressurized air to a gap 24 between the air cylinder 12 and the piston 16. In this way, the pressurized air enters the gap 24 and forces the piston 16 away from the air cylinder 12. Also in this regard, as best shown in FIG. 2, the pressurized air forces the piston 16 to the right and compresses the spring 18, which otherwise forces the piston 16 toward the air cylinder 12. This feature disengages the clutch and decreases the fan speed to idle.

Also, the air cylinder 12 has an inner surface 26 for contacting a seal 28 within a recess 30 of the piston 16. It will be appreciated that the seal 28 is utilized for sufficiently sealing air between the air cylinder 12 and the piston 16 and therefore allowing the pressurized air to move the piston 16 against the force of the spring 18.

The piston rod 14 has an end portion 32 comprised of an annular ledge 34 and a threaded shaft 36. The threaded shaft 36 extends through an aperture 38 formed in the air cylinder and receives a nut 39 or other suitable threaded fastener. In this way, the air cylinder 12 and a gasket 40 are sandwiched between the nut 39 and the ledge 34. Sufficient torque is applied to the nut 39 for sealing the air cylinder 12 against the piston rod 14. In this embodiment, the nut 39 is fastened to the threaded shaft 36 with sufficient force for withstanding a pressure of about 120 psi within the air cylinder 12. As detailed below, the threaded shaft 36 has an axial slot 42 for receiving the stepped tab portion 48 and preventing the air cylinder 12 from spinning on the piston rod 14.

The air cylinder 12 is comprised of a single-piece stamping with a cylinder portion 44, a washer portion 46, and the stepped tab portion 48. This one-piece construction is beneficial for minimizing the manufacturing cycle time and the costs associated therewith, as one skilled in the art will appreciate that a multiple-piece construction would require an additional sub-assembly process.

As shown in FIG. 2, the cylinder portion 44 extends generally along the longitudinal centerline axis 20. The cylinder portion 44 has the washer portion 46 extending concentrically inward therefrom and toward the longitudinal centerline axis 20. The washer portion 46 has the stepped tab portion 48, which extends concentrically inward therefrom and has a smaller wall thickness than the washer portion 46.

In this embodiment, the washer portion 46 is comprised of an outer concentric portion 50, an intermediate concentric portion 52, and an inner concentric portion 54. The outer concentric portion 50 extends inward directly from the cylinder portion 44. Further, the outer concentric portion 50 has the intermediate concentric portion 52 extending inward therefrom. This intermediate concentric portion 52 extends somewhat along the longitudinal centerline axis 20. For instance, as shown in FIG. 2, the intermediate concentric portion 52 extends to the right along the longitudinal centerline axis 20. Also, the intermediate concentric portion 52 has the inner concentric portion 54 extending inward therefrom substantially parallel to the outer concentric portion 50. It is contemplated that the washer portion 46 can have other suitable configurations as desired.

As introduced above, the stepped tab portion 48 is utilized for contacting the piston rod 14 and preventing the air cylinder 12 from spinning on the piston rod 14. This feature is beneficial for preventing the nut 39 from loosening, which could otherwise breach the seal between the air cylinder 12 and the piston 16. To that end, the threaded shaft 36 of the piston rod 14 has the axial slot 42 to receive the stepped tab portion 48. Moreover, the stepped tab portion 48 extends inward from the inner concentric portion 54 and into the aperture 38. As shown in FIG. 2, the stepped tab portion 48 has a smaller wall thickness than the inner concentric portion 54. Specifically, the stepped tab portion 48 has an outer surface 49a and an inner surface 49b. The outer surface 49a is substantially coplanar with an exterior surface 55a of the inner concentric portion 54. Also, the inner surface 49b is recessed a predetermined distance from an interior surface 55b of the inner concentric portion 54. In this way, the inner surface 49b of the tab 48 is forced against the threaded shaft 36 within the slot 42 while the interior surface 55b of the inner concentric portion 54 is forced against the ledge 34. Accordingly, the stepped tab portion 48 and the inner concentric portion 54 are sandwiched between the nut 39 and the ledge 34.

It will be appreciated the stepped tab portion 48 can also be beneficial for preventing the air cylinder 12 from spinning during the stamping process and/or during the assembly process of the pneumatic fan drive system 10. Specifically, during the assembly process, a fixture can engage the stepped tab portion 48 and secure the air cylinder 12 in a fixed position while a torque applicator applies torque to the nut 39 and attaches the air cylinder 12 to the piston rod 14.

The air cylinder 12 is a deeply drawn construction comprised of mild steel. In this embodiment, the air cylinder 12 is comprised of 1010 steel with a substantially uniform thick wall of 0.116 inches. As described above, it is understood that the stepped tab portion 48 is thinner than the remaining portion of the single-piece stamping yet sufficiently thick for providing a durable overall construction. For that reason, the air cylinder 12 is sufficiently strong and rigid for receiving a fan pilot (not shown) of a fan (not shown) and properly mounting the fan. However, it is contemplated that the air cylinder 12 can instead be comprised of various other suitable materials with a variety of other thicknesses as desired.

One skilled in the art will appreciate that a deeply drawn construction of mild steel can be formed with substantially little or no surface defects. In other words, the mild steel can be more easily formed without tears, cracks, scratches, or other surface blemishes. In this regard, the air cylinder 12 has a substantially smooth surface, which can minimize wear on the seal 28 and thus prolong the life of the seal 28. This feature is also advantageous for minimizing power lost to frictional forces between the air cylinder 12 and the seal 28.

Also in this embodiment, the surface 56 of the air cylinder 12 has an e-coating 58 for further decreasing the coefficient of friction of that surface 56. One skilled in the art will understand that the e-coating 58 is applied to the surface 56 by an immersion process in which charged particles are attracted to the oppositely charged metal air cylinder. As the particles are deposited, a finish begins to insulate the metal from the surrounding charged solution. Deposition continues until the coating thickness is sufficient to form a barrier against further attraction. It will be appreciated that this process can minimize wasted or otherwise unused raw materials. For that reason, the e-coating 58 is beneficial for preserving the environment and minimizing manufacturing costs.

In this embodiment, the e-coating 58 has an average surface roughness of approximately 0.25 to 0.39 micrometers. However, it is understood that the average surface roughness can be less than 0.25 micrometers or greater than 0.39 micrometers as desired. The e-coating 58 is sufficiently durable for lasting at least one million cycles of piston reciprocation. However, it is also contemplated that the e-coating can be sufficiently durable for withstanding more or less than a million cycles as desired.

The e-coating 58 is beneficial for further minimizing frictional forces between the air cylinder 12 and the seal 28. In this way, the e-coating 58 further increases the life of the seal 28 and avoids premature coupling failure. In addition, the e-coating 58 also shields the mild steel from corrosive substances.

While the best modes for carrying out the present invention have been described in detail herein, those familiar with the art to which this invention relates will recognize various alternate designs and embodiments for practicing the invention as defined by the following claims. All of these embodiments and variations that come within the scope and meaning of the present claims are included within the scope of the present invention.

What is claimed is:

1. An air cylinder for a pneumatic fan drive system comprising:

a single-piece stamping for said pneumatic fan drive system;

said single-piece stamping having a stepped tab portion for attaching to a piston rod for said pneumatic fan drive system;

said single-piece stamping comprising;

a cylinder portion extending a longitudinal centerline axis;

a washer portion extending inward from said cylinder portion;

said washer portion defining an aperture for receiving said piston rod; and said stepped tab portion extending into said aperture;

said stepped tab portion comprising a reduced thickness portion of said single-piece stamping; and said stepped tab portion for inserting into an axial slot in said piston rod;

said washer portion having an inner concentric portion sandwiched between a nut and said piston rod;

said stepped tab portion having an outer surface and an inner surface with said outer surface substantially coplanar with an exterior surface of said washer portion and said inner surface recessed from said interior surface of said washer portion; and said stepped tab portion extends from said washer portion toward said longitudinal centerline axis.

2. The air cylinder recited in claim 1 wherein said single-piece stamping has an e-coating for improving a surface finish and inhibiting corrosion of said single-piece stamping.

3. The air cylinder recited in claim 1 wherein said single-piece stamping has a deeply drawn construction comprised of a mild steel.

4. The air cylinder recited in claim 3 wherein said mild steel is 1010 steel.

5. The air cylinder recited in claim 1 further comprising:

said washer portion and said cylinder portion formed during a primary stamping operation;

said stepped tab portion formed during a secondary stamping operation;

said single-piece stamping having an e-coating for improving a surface finish and inhibiting corrosion of said single-piece stamping; and said single-piece stamping having a deeply drawn construction comprised of a mild steel.

6. A pneumatic fan drive system, comprising:

a piston rod having an end portion comprised of a ledge and a threaded shaft; a threaded fastener fastened to said threaded shaft; and an air cylinder sandwiched between said threaded fastener and said ledge; said air cylinder comprising a single-piece stamping with a stepped tab portion for attachment to a piston rod; and said air cylinder having an interior surface and said stepped tab portion having an inner surface that is recessed from said interior surface by a predetermined distance.

7. The pneumatic fan drive system recited in claim 6 wherein said threaded shaft has an axial slot receiving said stepped tab portion of said air cylinder.

8. The pneumatic fan drive system recited in claim 7 wherein said axial slot is offset from said ledge along a longitudinal centerline axis of said piston rod.

9. The pneumatic fan drive system recited in claim 8 wherein said axial slot extends substantially along said threaded shaft.

10. The pneumatic fan drive system recited in claim 6 wherein said single-piece stamping comprises:

a cylinder portion extending along a longitudinal centerline axis;

a washer portion extending inward from said cylinder portion;

said washer portion defining an aperture for receiving said piston rod; and said stepped tab portion extending into said aperture;

said stepped tab portion comprising a reduced thickness portion of said single-piece stamping;

said stepped tab portion inserting into an axial slot formed in said threaded shaft of said piston rod.

11. The pneumatic fan drive system recited in claim 10 wherein said washer portion has an exterior surface and said stepped tab portion has an outer surface substantially coplanar with said exterior surface.

12. The pneumatic fan drive system recited in claim 11 wherein said threaded shaft of said piston rod has an axial slot offset from said ledge by said predetermined distance.

13. An air cylinder for a pneumatic fan drive system comprising:

a single-piece stamping for said pneumatic fan drive system;

said single-piece stamping having a substantially uniform thickness with a stepped tab portion having a reduced thickness for attaching to a piston rod for said pneumatic fan drive system; and said air cylinder having an interior surface and said stepped tab portion having an inner surface that is recessed from said interior surface by a predetermined distance.

14. The air cylinder recited in claim 13 wherein said single-piece stamping comprises:

a cylinder portion extending along longitudinal centerline axis;

a washer portion extending concentrically inward from said cylinder portion;

said washer portion defining an aperture for receiving said piston rod; and said stepped tab portion extending from said washer portion into said aperture;

said stepped tab portion inserting into an axial slot formed in said piston rod.

15. The air cylinder recited in claim 14 wherein said washer portion has an inner concentric portion sandwiched between a nut and said piston rod.

16. The air cylinder recited in claim 14 wherein said stepped tab portion is sandwiched between a nut and said piston rod.

17. The air cylinder recited in claim 15 wherein said stepped tab portion extends from said inner concentric portion and toward said longitudinal centerline axis.

18. The air cylinder recited in claim 13 wherein said single-piece stamping has an e-coating for improving a surface finish and inhibiting corrosion of said single-piece stamping.

* * * * *